United States Patent Office 3,290,319
Patented Dec. 6, 1966

3,290,319
SUBSTITUTED CARBAMATES OF PYRIDINE 2,6-DIMETHANETHIOLS
Richard A. Partyka, Liverpool, N.Y., assignor to Bristol-Myers Company, New York, N.Y., a corporation of Delaware
No Drawing. Filed Feb. 26, 1965, Ser. No. 435,708
7 Claims. (Cl. 260—294.8)

This invention relates to new synthetic compounds having valuable anti-inflammatory properties and, more particularly, to di-N-mono- and di-alkylcarbamates of pyridine 2,6-dimethanethiols.

It was the object of the present invention to provide novel and nontoxic compounds which in mammals prevent passive cutaneous anaphylaxis and which by their nature are free of the undesirable side-effects caused by the steroids generally used for such purposes. It was a further object of the present invention to provide nontoxic agents useful in the alleviation of the symptoms of such inflammatory processes as purpura.

The objects of the present invention have been achieved by the provision according to the present invention, of a member selected from the group consisting of a compound of the formula

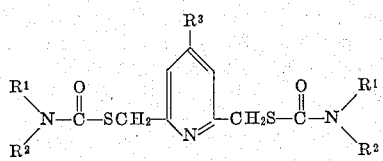

wherein $R^1$ is a member selected from the group consisting of hydrogen and lower alkyl, $R^2$ is a member selected from the group consisting of lower cycloalkyl and lower alkyl, and $R^3$ is a member selected from the group consisting of hydrogen, chloro, bromo, iodo, fluoro, trifluoromethyl, lower alkyl and lower alkoxy; and nontoxic, pharmaceutically acceptable acid addition salts thereof, including salts with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, ascorbic acid and the like.

Preferred embodiments of the present invention are the compounds of the formula

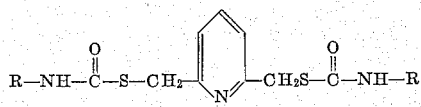

wherein R is lower alkyl or lower cycloalkyl.

The compounds of the present invention are synthesized from pyridine 2,6-dimethanethiols of the structure

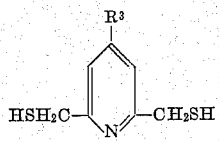

wherein $R^3$ has the meaning set forth above in any one of three ways, i.e.

(a) By reaction with compounds of the formula $R^2NCO$ wherein $R^2$ represents lower alkyl or lower cycloalkyl, or (b) By reaction with compounds of the formula

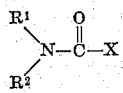

wherein $R^1$ is hydrogen or lower aykyl, $R^2$ is lower alkyl or lower cycloalkyl and X is halogen, alkoxy or phenoxy, or (c) By reaction with phosgene and then with an amine of the formula

wherein $R^1$ is hydrogen or lower alkyl and $R^2$ is lower alkyl or lower cycloalkyl.

Thus, in one process of the present invention the appropriate pyridine 2,6-dimethanethiol is reacted with an alkyl isocyanate in a solvent or diluent such as benzene, toluene, chlorobenzene, acetonitrile, chloroform, tetrahydrofuran or pyridine. The reaction is preferably carried out at a temperature from room temperature to 150° C., especially at about the boiling point of the solvent or, when in pyridine, in a pressure vessel at about 100° C. If desired, use is made of a catalyst such as a tertiary amine, e.g. trimethylamine, triethylamine, N-alkylpiperidine, pyridine, or a metal alkoxide, e.g. potassium tert.-butoxide. In place of the alkyl isocyanate use can be made of compounds which are converted under the reaction conditions, e.g. upon heating, to such isocyanates; such compounds include acyl azides.

In another process of the present invention the appropriate pyridine 2,6-dimethanethiol is reacted with an acid chloride of the formula given in (b) above in a solvent with heating if desired. When the acid chloride is replaced by an ester, as where X in (b) represents alkoxy or phenoxy, use is made of a catalyst such as sulfuric acid, toluene sulfonic acid, and trifluoroacetic acid or of a metal alkoxide such as aluminum isopropoxide or potassium tert.-butoxide. Conditions used are otherwise as noted above.

In the third process the appropriate pyridine 2,6-dimethanethiol is dissolved or suspended in an organic solvent and, if desired, a tertiary amine is added as a catalyst or dehydrochlorinating agent. Then phosgene is added, preferably at room temperature or better below 10° C. Finally there is added a mono- or di-lower alkylamine to form the desired product.

The pyridine 2,6-dimethanethiols used as reagents in the processes of the present invention are prepared by treatment of the corresponding pyridine 2,6-dimethanols with thiourea and hydrobromic acid as exemplified below; see also Frank et al., J. Amer. Chem. Soc. 68, 2103 (1946). Such pyridine 2,6-dimethanols are either disclosed in the literature or are prepared by known methods, e.g. by one of the following syntheses from the art:

(1) The corresponding 2,6-lutidines of the formula

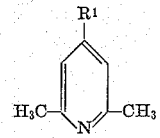

are oxidized by the procedure of Boekelheide et al., J. Amer. Chem. Soc. 76, 1286–1291 (1954);

(2) The corresponding di-aldehydes of the formula

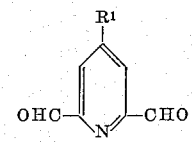

are oxidized by the procedure of Mathes et al., Berichte, 86, 584–588 (1953);

(3) Di-esters, illustrated as the diethyl ester, of the formula

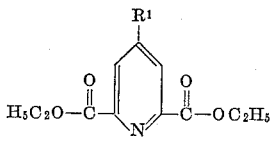

are reduced to the dimethanol by the use of a complex metal hydride (e.g. lithium aluminum hydride, di-isobutyl aluminum hydride, sodium borohydride) as disclosed, for example, by Barnes et al., J. Amer. Chem. Soc., 75, 3830–3831 (1953) or as used by Yoshida and Kumagae, Nippon Kagaku Zasshi, 81, 345–346 (1960) [C.A. 55, 6477 g., (1961)] for the preparation of 2,5-pyridinedimethanol, which is also called 2,5-bis(hydroxymethyl)pyridine, from dimethyl isocinchomeronate.

The 2,6-lutidines of the first procedure given above are prepared by the use of the appropriate reagents in syntheses known to the art, e.g. the Hantzch synthesis in which an aliphatic aldehyde is condensed with acetoacetic ester in the presence of ammonia to form a dihydropyridine which is readily oxidized by nitric acid to a pyridine derivative of the formula

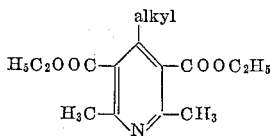

which is then readily hydrolyzed and decarboxylated to give the compound of the formula

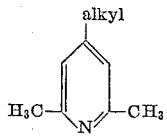

or the Chichibabin process [Bull. Soc. Chim. France, 3, 1607–32, (1936)] or the processes disclosed or discussed by Cislak in U.S. Patent 2,786,846, issued March 26, 1957, or the procedures described in Pyridine and Its Derivatives, Part II, E. Klingsberg, Interscience, 1961, chapter V, Alkyl and Aryl-Pyridines, pages 155–298 and the references cited therein.

The 2,6-diesters of the third procedure given above are prepared by conversion of chelidamic acid according to C.A. 51, 2776 to diethyl 4-chloro-2,6-pyridinedicarboxylate of the formula

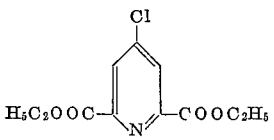

which is then reacted (a) with ammonia, amines, sodium alkoxides or sodium mercaptides or (b) in the malonic ester synthesis with compounds of the formula alkyl-CH(COOC$_2$H$_5$)$_2$ followed by the usual saponification and decarboxylation to give the desired diesters of 4 - alkyl - 2,6 - pyridinedicarboxylic acids. When desired the chlorodiester is first reduced to the chloro-dimethanol and then used in the malonic ester synthesis.

In an alternative procedure such diesters are converted to the diacids which are reacted as salts with a compound such as ethyl chloroformate to give a mixed anhydride which is then converted to the diazide by reaction with sodium azide. Such diazides are easily reduced to dimethanols by reaction with complex metal hydrides, e.g. with sodium borohydride.

Reference above to an abstract in Chemical Abstracts incorporates herein by reference the full text of the publication or patent of the abstract and also any pertinent references cited in such publication or patent.

The term "lower alkyl" as used herein refers to straight and branched chain saturated monovalent aliphatic hydrocarbon radicals having from one to ten carbon atoms inclusive, e.g. methyl, ethyl, propyl, isopropyl, butyl, normal and secondary and tertiary butyl, amyl, decyl, etc.

The preferred lower alkyl groups are those having from one to six carbon atoms. Similarly the term "lower alk-" in such terms as lower alkoxy and lower alkylamino limits the alkyl moiety of the latter radicals to the same alkyl group as defined above.

The term lower cycloalkyl includes cyclopropyl, cyclobutyl, cyclopentyl and cyclohexyl.

The compounds of this invention are useful in the treatment of disease in animals, including particularly the higher animals such as man, horses, and dogs. The utility of the present compounds is enhanced by the absence of steroidal side effects and their lack of monoamine oxidase inhibiting activity.

The compounds are administered to the affected host in amounts ranging from 2 to 50 mg. per kilogram of body weight per day. The usual dosage is from about 5 to about 30 mg. per kg. per day. The compounds can be administered parenterally, and preferably, orally. The compounds can be orally administered in the conventional forms, i.e. as tablets, capsules, suspensions, etc. The compounds of this invention can be combined in one dosage form with other therapeutically effective agents, including analgesics and the steroids which have also been used in the treatment of inflammatory disease.

The following examples are given in illustration, but not in limitation, of the present invention. All temperatures are given in degrees centigrade.

EXAMPLE 1

Pyridine 2,6-dimethanethiol

A solution of 50 g. (0.285 mole) pyridine 2,6-dimethanol hydrochloride, 50.0 g. (0.658 mole) thiourea and 288 g. of 48% aqueous hydrobromic acid (1.71 moles) was refluxed under an atmosphere of nitrogen for twelve hours. After cooling, a solution of 80 g. (2.0 moles) sodium hydroxide in 200 ml. water was slowly added through a dropping funnel. The resulting reaction mixture was refluxed for 45 minutes under an atmosphere of nitrogen, cooled and thoroughly extracted with methylene chloride. The combined extracts were washed with saturated salt solution, dried over sodium sulfate and filtered. After removal of the solvent, the residue was distilled under reduced pressure. In this manner, there was obtained 31.8 g. (65.3%) of pyridine 2,6-dimethanethiol as clear colorless material, B.P. 94–96°/0.35 mm. Spectra were consistent with structure. Because of the seemingly unstable nature of the compound no attempt was made at preparation of an analytical sample.

Pyridine 2,6-dimethanethiol di(methylcarbamate)

A solution of 5.0 g. (0.0292 mole) pyridine 2,6-dimethanethiol, 15 ml. methyl isocyanate, and 100 ml. pyridine was allowed to stand at room temperature in a pressure bottle for 15 hours. After this time, the pyridine was removed under reduced pressure; 100 ml. of benzene was added and also removed under reduced pressure. The resulting solidified residue was recrystallized from ethyl acetate, thereby affording 7.34 g. (88.1%) of pyridine 2,6-dimethanethiol di(methylcarbamate), M.P. 120.5–122°.

*Analysis.*—Calcd. for C$_{11}$H$_{15}$N$_3$O$_2$S$_2$: C, 46.29; H, 5.30; N, 14.72; S, 22.47. Found: C, 46.54; H, 5.35; N, 14.95; S, 22.22.

This compound was shown to prevent passive cutaneous anaphylaxis in the following manner.

In the guinea pig test 2 ml. of the test solution or suspension in 0.9% saline were injected subcutaneously on one side of the shaved abdomen of white guinea pigs weighing 250–300 gm. One-half hour later a 0.1 ml., intradermal injection of a 1:2500 dilution in 0.9% saline of a commercially obtained rabbit antiovalbumin serum was made at the center of the subcutaneous injection. A similar injection was also made on the contralateral side of the abdomen where no local drug treatment was given.

Four hours later 1.0 ml. of a combined 0.5% ovalbumin and 1.0% Evans blue dye solution in 0.9% saline was injected intravenously. An anaphylactic response with consequent vascular damage was manifested by extravasation of the Evans blue dye from the circulation to form a clearly demarcated, blue spot. Since the Evans blue dye is protein bound, damage to the vessel walls had to be extensive enough that protein was escaping to give a positive response.

Complete prevention of any blue discoloration in the skin was used as the criteria for effectiveness. This was determined after sacrificing the animal, reflecting the skin, and examining the underside after it was freed of all subcutaneous tissue.

At a concentration of 0.15% this compound completely blocked the response in two out of three animals; the response was not blocked in any of the three controls, i.e. at the untreated sites.

Since antihistaminic agents are also active in the above test, this compound was tested on isolated guinea pig ileum strips for its ability to block the spasmogenic response to histamine and found to be essentially inactive at levels up to 50 mcg./ml. in the bath.

EXAMPLE 2

Pyridine 2,6-dimethanethiol di(ethylcarbamate)

A solution of 5.0 g. (0.0292 mole) pyridine 2,6-dimethanethiol, 15 ml. ethyl isocyanate, and 100 ml. pyridine was allowed to stand at room temperature in a pressure bottle for 15 hours. Workup was the same as described for Example 1. Recrystallization from isopropyl alcohol-Skellysolve B afforded the analytical sample of pyridine 2,6-dimethanethiol di(ethylcarbamate), M.P. 106–107°.

Analysis.—Calcd. for $C_{13}H_{19}N_3O_2S_2$: C, 49.81; H, 6.11; N, 13.41. Found: C, 49.95; H, 6.10; N, 13.70.

EXAMPLE 3

Pyridine 2,6-dimethanethiol di(cyclopropylcarbamate)

A solution of 5.0 g. (0.0292 mole) pyridine 2,6-dimethanethiol, 7.2 g. (0.0648 mole) cyclopropylcarboxylic acid azide, prepared according to the procedure of Weinstock, J. Org. Chem. 26, 3511 (1961), and 100 ml. pyridine was refluxed for two hours. After this time the pyridine was removed, 100 ml. benzene added and also removed. The residue was dissolved in ethanol, decolorized and finally cooled. A total of 3.02 g. (30.7%) of pyridine 2,6-dimethanethiol di(cyclopropylcarbamate) was realized. Recrystallization from ethanol afforder the analytical sample, M.P. 146–148°.

Analysis.—Calcd. for $C_{15}H_{19}N_3O_2S_2$: C, 53.38; H, 5.68; S, 19.00. Found: C, 53.45; H, 5.68; S, 18.82.

EXAMPLE 4

Substitution in the procedure of Example 1 for the methyl isocyanate used therein of an equimolar weight of n-hexyl isocyanate, isopropyl isocyanate and sec.-butyl isocyanate, respectively, produces the corresponding di-N-n-hexylcarbamates, di-N-isopropylcarbamates and di-N-sec.-butylcarbamates, respectively.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A member selected from the group consisting of a compound of the formula

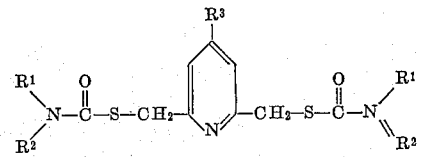

wherein $R^1$ is a member selected from the group consisting of hydrogen and lower alkyl, $R^2$ is a member selected from the group consisting of lower cycloalkyl and lower alkyl and $R^3$ is a member selected from the group consisting of hydrogen, chloro, bromo, iodo, fluoro, trifluoromethyl, lower alkyl and lower alkoxy; and nontoxic, pharmaceutical acceptable acid addition salts thereof.

2. A compound of the formula

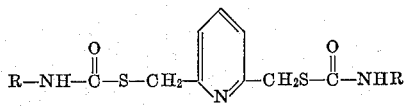

wherein R represents lower alkyl.

3. A compound of the formula

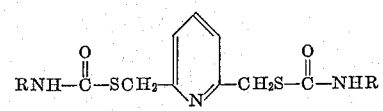

wherein R represents lower cycloalkyl.

4. A compound of the formula

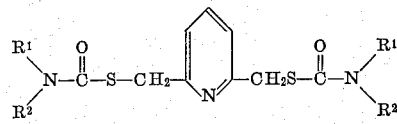

wherein $R^1$ and $R^2$ represents lower alkyl.

5. Pyridine 2,6-dimethanethiol di(methylcarbamate).
6. Pyridine 2,6-dimethanethiol di(ethylcarbamate).
7. Pyridine 2,6-dimethanethiol di(cyclopropylcarbamate).

References Cited by the Examiner
UNITED STATES PATENTS
2,786,846   3/1957   Cislak _____ 260—290

References Cited by the Applicant
FOREIGN PATENTS
6,403,905   10/1964   Netherlands.
646,457    4/1964   Belgium.

OTHER REFERENCES

R. G. Arnold, J. A. Nelson and J. J. Verbanc: Chem. Revs., 57, 47 (1957).

W. Baker, K. M. Buggle, J. F. W. McOmie and D. A. M. Watkins: J. Chem. Soc., 3594 (1958).

C. H. Grogan, L. M. Rice and E. E. Reid: J. Org. Chem., 20, 50 (1955).

D. F. Lee, B. Saville and B. R. Trego: Chem. and Ind., 868 (1960).

E. Lieber, C. N. Pillai and R. Hites: Can. J. Chem., 35, 832 (1957).

Patent Journal (Republic of South Africa), vol. 4, No. 179, page 38 (November 4, 1964).

A. J. Speziale and L. R. Smith: J. Org. Chem., 28, 1805 (1963).

W. S. Wadsworth, Jr., and W. D. Emmons: J. Org. Chem., 29, 2816 (1964).

WALTER A. MODANCE, *Primary Examiner.*

ALAN L. ROTMAN, *Assistant Examiner.*